United States Patent [19]
Gergen

[11] 3,865,776
[45] Feb. 11, 1975

[54] KINK-RESISTANT POLYMERIC TUBING

[75] Inventor: William P. Gergen, Garden Grove, Calif.

[73] Assignee: Shell Oil Company, Houston, Tex.

[22] Filed: Feb. 11, 1974

[21] Appl. No.: 441,722

[52] U.S. Cl............... 260/33.6 AQ, 260/33.6 PQ, 260/876 B
[51] Int. Cl........................ C08c 11/22, C08f 15/04
[58] Field of Search.. 260/33.6 AQ, 876 B, 33.6 PQ

[56] References Cited
UNITED STATES PATENTS

| | | |
|---|---|---|
| 3,485,787 | 12/1969 | Haefele et al............... 260/33.6 AQ |
| 3,823,203 | 7/1974 | De La Mare.................... 260/876 B |
| 3,827,999 | 8/1974 | Crossland..................... 260/33.6 AQ |
| 3,830,767 | 8/1974 | Condon....................... 260/33.6 AQ |

Primary Examiner—Donald E. Czaja
Assistant Examiner—H. H. Fletcher

[57] ABSTRACT

Tubing useful for medical purposes particularly which is resistant to kinking and has a useful degree of clarity comprises a combination of two types of block polymers, mineral white oil, high melt flow polypropylene and a resin.

4 Claims, 3 Drawing Figures

FIG. 1
TUBING WHICH KINKS SEVERELY

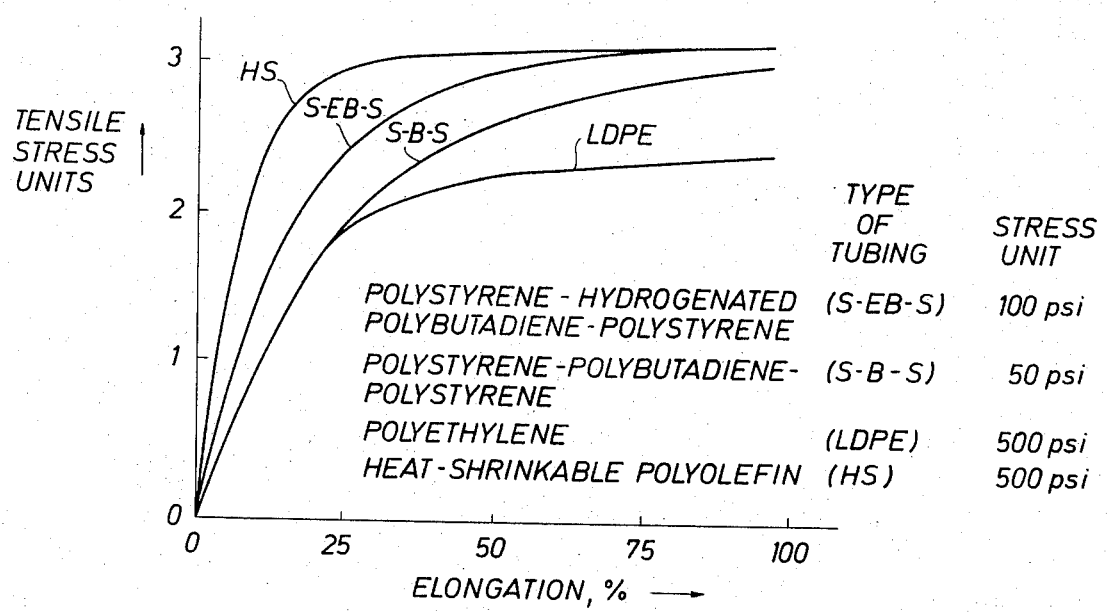

| TYPE OF TUBING | | STRESS UNIT |
|---|---|---|
| POLYSTYRENE - HYDROGENATED POLYBUTADIENE - POLYSTYRENE | (S-EB-S) | 100 psi |
| POLYSTYRENE - POLYBUTADIENE - POLYSTYRENE | (S-B-S) | 50 psi |
| POLYETHYLENE | (LDPE) | 500 psi |
| HEAT-SHRINKABLE POLYOLEFIN | (HS) | 500 psi |

FIG. 2
TUBING WHICH IS KINK-RESISTANT

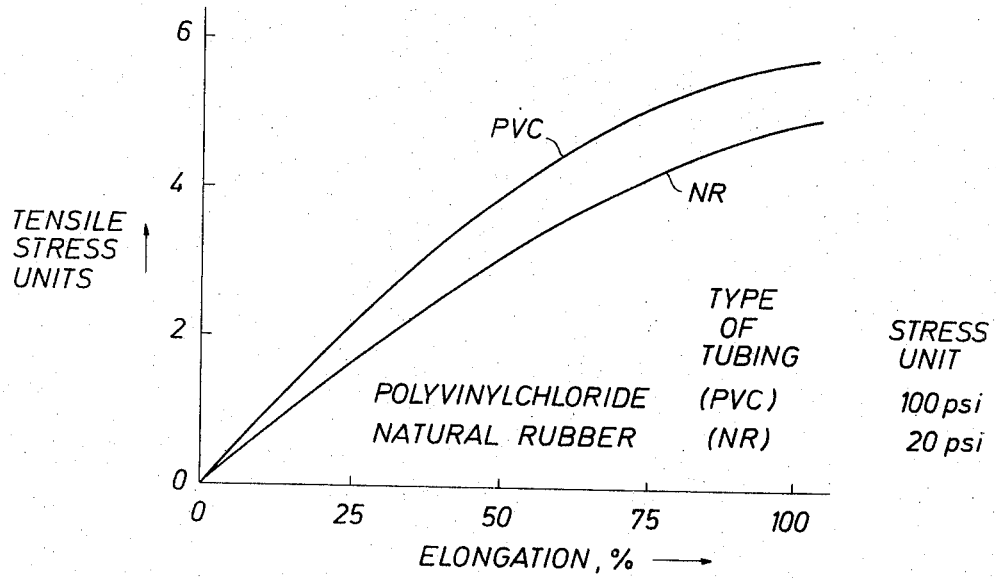

| TYPE OF TUBING | | STRESS UNIT |
|---|---|---|
| POLYVINYLCHLORIDE | (PVC) | 100 psi |
| NATURAL RUBBER | (NR) | 20 psi |

TENSILE STRESS-STRAIN CURVES ELONGATED IN THE DIRECTION OF EXTRUSION

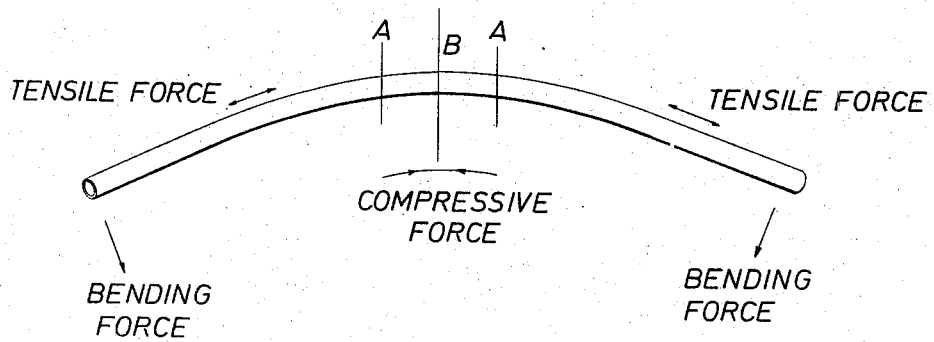
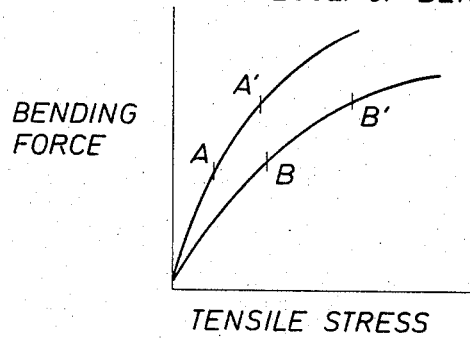
(a) TENSILE STRESS AS A RESULT OF BENDING FORCE
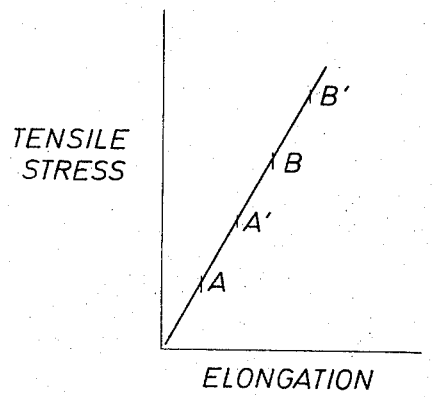
(b) IDEALIZED STRESS-STRAIN CURVE FOR KINK-RESISTANT TUBING
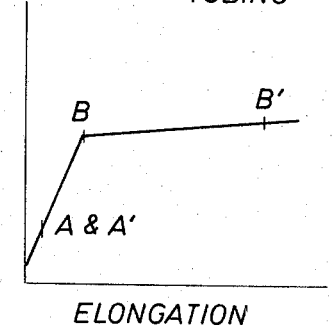
(c) IDEALIZED STRESS STRAIN CURVE FOR KINKABLE TUBING
*FIG. 3*
MECHANISM OF KINKING AND KINK-RESISTANCE IN FLEXIBLE TUBING

KINK-RESISTANT POLYMERIC TUBING

BACKGROUND OF THE INVENTION

The present invention relates to new and useful unvulcanized compositions particularly designed for use in the production of tubing or elastomeric rods which are resistant to kinking when bent and display a useful degree of clarity or translucency.

Tubing utilized for medical purposes in the past has usually comprised PVC or vulcanized gum natural rubber. While both of these can be compounded to produce kink resistant tubing and clear tubing in the case of PVC, each of them possesses inherent deficiencies which limit their use for medical or other purposes. For example, the vulcanizing components in the natural rubber compounds and the plasticizers utilized in the PVC compounds may be medically objectionable.

A class of block copolymers has been developed during the past few years which does not require vulcanizing. These may take a number of molecular forms of which the most elementary replacement for vulcanized natural rubber may be represented by the generic formula ABA, wherein the polymer blocks A represent, for example, polyalkenylarene while polymer block B represents a polymer of a conjugated diene or hydrogenated equivalent or derivative thereof. The molecular weight of the individual blocks is readily controlled during synthesis and the physical properties of the resulting block copolymers are dependent upon a number of relationships including the individual block molecular weights, the microstructure of the elastomeric center blocks, the weight proportion of the end blocks to the total molecule and the identity of the block species.

Many of the utilities of such copolymers depend upon their being compounded with extending oils, fillers, resins and other components. The mineral oils employed widely as rubber extending oils are utilized in widely varying proportions. Recently, U.S. Pat. No. 3,676,387 has shown combinations of paraffinic oils with non-hydrogenated block copolymers to result in gels exhibiting the properties of a flexible, soft elastomeric composition. However, the compositions described in the working examples of that patent would not provide the kink resistance required for use as described more fully hereinafter. The reason for this will also appear in the following discussion.

OBJECT OF THE INVENTION

It is a particular object of the present invention to provide compositions useful for medical purposes such as blood bags, urinary tubes, gas delivery tubes, blood tubing, catheters and the like. A specific object of the invention is to provide such compositions which are not only resistant to kinking but also possess a degree of clarity or transparency suitable for their intended medical purposes, and in addition will not distort or change properties when sterilized under normal autoclave conditions with live steam. Other objects will become apparent during the following detailed description of the invention.

STATEMENT OF THE INVENTION

Compositions suitable for the above-stated purposes comprise the combination of the following components:

A. 50-100 parts by weight of a block copolymer having at least two monoalkenylarene polymer blocks and at least one substantially completely hydrogenated conjugated diene polymer block, said copolymer comprising 28-35 percent by weight of monoalkenylarene polymer blocks, each of the latter blocks having an average molecular weight between about 20,000 and 35,000;

B. 5-50 parts by weight of a second block copolymer having at least two monoalkenylarene polymer blocks and at least one substantially completely hydrogenated conjugated diene polymer block, said copolymer comprising 26-35 percent by weight of monoalkenylarene polymer blocks, each of which has an average molecular weight between about 8,000 and 15,000;

C. 75-250 parts by weight of a mineral white oil;

D. 10-50 parts by weight of a polypropylene having a melt flow less than about 14 dg./min. and E. 0-35 parts by weight of a resin.

It has been found in accordance with this invention that the compositions summarized above exhibit an outstanding degree of kink resistance and a degree of clarity sufficient that materials passing through tubes can be visually monitored. In the following discussion, the term "clarity" will include both translucency and transparency.

The drawings forming a part of the present specification help to illustrate the basis for the combination of components necessary to achieve both of these desired objectives in a single composition, it being understood that kinking resistance on the one hand or clarity on the other can be achieved in separate compositions of substantially greater simplicity. Kinking is a qualitative property not immediately subject to quantitative measurement. However, a simple hand test for kinking resistance of flexible tubing may be used which consists of bringing the ends of an appropriate length of tubing together and parallel, shortening the loop formed until kinking occurs and measuring the outer circumference of the loop portion of the tubing. A circumference of nine inches or less without kinking is considered to be acceptable for tubing of approximately ⅜ inch diameter. The use of a single block copolymer such as one having block molecular weights of 15,000-37,000-15,000 compounded with oil and polypropylene of low melt flow exhibited kinking even when the loop circumference was greater than 36 inches.

Kinking involves more than compressive forces. It also involves stress-strain response in tension. Two distinct types of curves are displayed which are generally characteristic of kinking tubes on the one hand and non-kinking tubes on the other. FIG. I shows the type of curve which is characteristic of tubings which kink. The most significant feature is that the elastic portion of the curve changes abruptly from that of the material with a relative high Young's modulus (steep slope) at low strains to that of a material with a relatively lower Young's modulus (gradual slope) at strains of 25-100 percent. This curve shape is consistent regardless of the absolute values of the stress. FIG. II, on the other hand, shows the stress-strain response of kink-resistant tubings typified by plasticized PVC or vulcanized natural rubber. It will be noted that there is no abrupt change in the elastic modulus, only a slight tapering off at relatively high strains. An increase in strain is met by a nearly proportional increase in stress at any segment of the curve.

The practical applications of these observations to the kinking phenomenon are shown in FIG. III. The tubing segment illustrated at the top of the Figure is being bent into a loop. This process is essentially a forced deformation; that is, the stress is a result of the applied strain and strain is reasonably constant for any given loop size. Midway between the bending moments the stress is at a maximum, at point B on the loop. Tensile stress at the top of the tube and compressive stress at the bottom of the tube oppose at this point and strain is maximum. Points A, on either side of the apex, are in an increasingly lower level of strain and stress. From curve (a) it can be seen that an increase in bending force causes a proportional increase in tensile stress at B and at A. Curve (b) is a type of idealized curve for non-kinking materials, the distribution of tensile stress is equal at point B and point A. The modulus of the material remains the same at B' and A'. Curve (c) illustrates the type of curve found for kinking tubing. It will be noted that the initial deformation has brought point B to a state where the modulus at that point is a small fraction of the modulus at point A. Therefore, a catastrophic strain (yielding) results from a small increase in stress. This leaves the tube in the condition where the material at zone B may be elongated as much as 100 percent while material at zone A may have elongated as little as 10 percent. The result is a kink. The compositions of the present invention are designed to change the stress-strain response from that depicted in (c) of FIG. III to at least an approximation of that depicted at (b).

For some applications, particularly medical applications, it is desirable for tubing to be as clear as possible so that the flow and appearance of fluids can readily be monitored. It has been found that reduced clarity in block polymer tubing can arise from two sources. The first, which can be termed inherent haze, arises from light scattered by dispersed components which differ somewhat in refractive index from the refractive index of their surroundings. The inherent haze encountered in these compositions is largely due to dispersed polypropylene. The amount of inherent haze is usually small but can be reduced by decreasing the concentration of polypropylene in the composition.

The second source of reduced clarity is termed surface haze. Inadequate mixing of the composition can result in surface irregularities and viscoelastic effects during extrusion can result in surface fractures. Both of these contribute to surface haze. Surface haze can be reduced by increasing mixing severity and by selection of appropriate extrusion conditions. It can also be reduced by increasing the oil content or by adding processing aids such as ethylene/vinyl acetate copolymers. Such formulation modifications change the balance of physical properties of the tubing but do not alter its kinking resistance.

It was found in an investigation of various types of block copolymers that non-kinking compounds resulted from the use of a relatively high molecular weight block copolymer having the structure polystyrene-hydrogenated polybutadiene-polystyrene and having segmental molecular weights of 25,000–100,000–25,000. However, compounds containing this polymer had an unsatisfactory degree of clarity. It was determined that processing of such high molecular weight polymers results in surface deformities which in turn give opaque or cloudy surfaces. This was not alleviated to any useful extent by the use of relatively low melt flow polypropylene but was substantially improved by the use of polypropylenes having a melt flow between about 8 and 14 dg/min., preferably between 10 and 13 dg/min. Processability was still further improved without appreciable decrease in the physical properties of the compositions by modifying the composition with the relatively low molecular weight block copolymer having, for example, end blocks of 8,000–15,000 average molecular weight. Furthermore, it was found that the use of the usual rubber extending oils, which may have an appreciable aromatic hydrocarbon content, resulted in relatively opaque tubing or at least tubing stocks having unsatisfactory clarity. Replacement of such oils with mineral white oils which are essentially paraffinic not only improved the compositions in this respect, but also enabled passage of relatively stringent conventional regulations for medical tubing stocks.

The block copolymers of the present invention may be either linear or branched in their molecular configurations. The monoalkenylarene polymer blocks, which preferably are either polystyrene or polyalphamethylstyrene, are formed by solution polymerization utilizing lithium based initiators to form a living polymer chain which is then block polymerized with a conjugated diene such as butadiene or isoprene or a mixture thereof. The living block copolymer thus formed may then be reacted with a second portion of the alkenylarene to form a second terminal block or may be coupled to form linear or branched block copolymers by adding coupling agents which may be either difunctional or polyfunctional, as desired.

The number average molecular weights referred to in the specification and claims are those preferably obtained as follows: The molecular weight of the first block polymerized was measured by gel permeation chromatography (GPC) of a terminated sample removed immediately after its polymerization. The chromatograph was calibrated using commercially available polystyrene molecular weight standards, prepared and tested by Mellon Institute procedures. The molecular weights of the second and third blocks polymerized were determined by measuring the polystyrene content of terminated samples removed immediately after polymerization of the second and third blocks, respectively. The molecular weights of the second and third blocks are based on the assumption that all of the polymerized monomer uniformly added to the active polymer chain ends.

Following the polymerization stages and coupling, if any, the products may be subjected to selective hydrogenation such that at least about 80 percent of the aliphatic double bonds in the diene block are reduced while no more than about 20 percent of the aromatic double bonds in the end blocks are reduced.

The mineral white oils utilized in the compositions of this invention preferably contain less than about 10 percent wt. aromatics by clay-gel analysis. The following are typical analyses and descriptions of suitable oils.

TABLE I

NAPHTHENIC AND PARAFFINIC WHITE OILS

| | Naphthenic | | | Paraffinic | |
|---|---|---|---|---|---|
| Grade | A | B | C | D | E |
| Viscosity, SUS at 100°F. | 95 | 1850 | 85 | 495 | 1912 |
| Viscosity, SUS at 210°F. | 38 | 90 | 38 | 64 | 130 |
| Gravity, °API | 26.9 | 22.1 | 34.5 | 30.9 | 28.8 |
| Specific Gravity, 60/60 | 0.8933 | 0.9212 | 0.8524 | 0.8713 | 0.8826 |
| Pounds/Gallon | 7.45 | 7.68 | 7.10 | 7.27 | 7.35 |
| Color, Saybolt D-156 | +30 | +25 | +30 | +30 | +25 |
| Flash COC °F. | 315 | 465 | 36 | 475 | 565 |
| Pour Point °F. | −55 | 5 | 5 | 15 | 25 |
| Acid Number | 0.00 | 0.00 | 0.00 | 0.00 | 0.00 |
| % Sulfur | L0.001 | L0.002 | L0.001 | L0.001 | L0.001 |
| Aniline Point °F. | 191 | 221 | 222 | 254 | 276 |
| Refractive Index at 20°C. | 1.4834 | 1.4978 | 1.4661 | 14760 | 1.4835 |
| Refractivity Intercept | 1.039 | 1.039 | 1.044 | 1.044 | 1.044 |
| Viscosity-Gravity Constant | 0.855 | 0.851 | 0.800 | 0.791 | 0.793 |
| Distillation °F, D-1160 | | | | | |
| IBP | 535 | 630 | 561 | 664 | 760 |
| 5% | 545 | 729 | 670 | 789 | 891 |
| 10% | 595 | 795 | 692 | 820 | 920 |
| 50% | 663 | 896 | 740 | 924 | 1050+ |
| 95% | 762 | 1018 | 794 | 1013 | — |
| Volatility, 22 hrs./225°F., Wt.% | 12.0 | 0.5 | 2.0 | 0.3 | 0.05 |
| UV Absorptivity at 260 mu | 0.002 | 0.104 | 0.005 | 0.004 | 0.028 |
| Clay-Gel Analysis, Wt.% | | | | | |
| Asphaltenes | 0.0 | 0.0 | 0.0 | 0.0 | 0.0 |
| Polar Compounds | 0.0 | 0.0 | 0.0 | 0.0 | 0.0 |
| Aromatics | 0.1 | 8.1 | 0.0 | 0.9 | 3.3 |
| Saturates | 99.9 | 91.9 | 100.0 | 99.1 | 96.7 |
| Carbon Type Analysis, % | | | | | |
| Aromatic Carbons | 0 | 0 | 0 | 0 | 0 |
| Naphthenic Carbons | 57 | 56 | 31 | 31 | 32 |
| Paraffinic Carbons | 43 | 44 | 69 | 69 | 68 |
| ASTM D-2226 Type | 104A | 104A | 104B | 104B | 104B |
| TiO$_2$ Discoloration, 48 hrs. | None | Trace | None | None | None |
| Specific Dispersion | 99.2 | 103.4 | 99.6 | 99.6 | 100.3 |

The resins employed in the production of the compositions of this invention may be compatible either with the end blocks or the mid block of the block copolymer. However, to provide tubing which has sufficiently high temperature performance so that it can be sterilized requires careful selection of a resin. The resin should either have a softening point higher than 100°C, or exhibit crystallinity. A suitable resin of the end block compatible type is identified as Piccotex 120, a copolymer of α-methylstyrene and vinyl toluene, with a ball and ring softening point of about 120°C. A suitable resin of the mid block-compatible type with crystallinity is ethylene/vinyl acetate copolymer. A number of such resins are commercially available. An important function of either type of resin is to serve as a flow promoter for the compositions.

Two suitable compositions exhibiting both kinking resistance and sufficient clarity are as follows:

In the table below, polymer A is a block copolymer having the structure polystyrene-completely hydrogenated polybutadiene-polystyrene with block molecular weights of 25,000-100,000-25,000.

Polymer B is a block copolymer of the same structure and block identity but having block molecular weights of 10,000-50,000-10,000. The polypropylene employed had a melt flow of 12 dg/min. The resin is identified as Piccotex 120, with a softening temperature of about 120°C.

TABLE II

| | Parts by Weight | |
|---|---|---|
| | No. 1 | No. 2 |
| Polymer A | 75 | 70 |
| Polymer B | 25 | 30 |
| White Oil | 100 | 110 |
| Polypropylene | 40 | 40 |
| Resin, α-methylstyrene/vinyl toluene copolymer | — | 20 |

I claim as my invention:

1. A composition comprising:
   a. 50-100 parts by weight of a block copolymer having at least two monoalkenylarene polymer blocks and at least one substantially completely hydrogenated conjugated diene polymer block, said copolymer comprising 31-35 wt. percent by weight monoalkenylarene polymer block content, each of said monoalkenylarene blocks having an average molecular weight between about 20,000 and 35,000;
   b. 5-50 parts by weight of a block copolymer having at least two monoalkenylarene polymer blocks and at least one substantially completely hydrogenated conjugated diene polymer block, said copolymer comprising 26-31 wt.% monoalkenylarene polymer block content, each of said monoalkenylarene blocks having an average molecular weight between about 8,000 and 15,000;
   c. 75-250 parts by weight of a mineral white oil;
   d. 25-50 parts by weight of a polypropylene having a melt flow between about 8 and 14 dg/min.; and
   e. 10-35 parts by weight of a resin, said resin being compatible with either the monoalkenylarene polymer blocks or the diene polymer block, and having a softening point higher than 100°C of exhibiting crystallinity.

2. A composition according to claim 1 wherein both block copolymers have the structure polystyrene-hydrogenated polybutadiene-polystyrene.

3. A composition according to claim 1 wherein the resin is a copolymer of vinyl toluene and alphamethylstyrene.

4. A composition according to claim 1 wherein
   a. the first block copolymer has the structure polystyrene-hydrogenated polybutadiene-polystyrene wherein the polystyrene blocks have average molecular weights between about 22,000 and 30,000 and comprise 32–34 wt. percent of the copolymer;
b. the second block copolymer has the same structure as the first, wherein the polystyrene blocks have average molecular weights between about 9,000 and 13,000 and comprise 27–30 wt. percent of the copolymer;
c. the white oil is present in an amount between 90 and 115 parts by weight;
d. the polypropylene has a melt flow between about 10 and 13 and is present in an amount between about 30 and 45 parts by weight; and
e. the resin is a copolymer of vinyl toluene and alphamethylstyrene having a softening point greater than 100°C.

* * * * *